US006375395B1

(12) United States Patent
Heintzeman

(10) Patent No.: US 6,375,395 B1
(45) Date of Patent: Apr. 23, 2002

(54) LASER GUIDE FOR HAND HELD POWER DRILL

(76) Inventor: Michael G. Heintzeman, 8200 Semmler Rd., Nisswa, MN (US) 56468

(*) Notice: Subject to any disclaimer, the term of this patent is extended or adjusted under 35 U.S.C. 154(b) by 0 days.

(21) Appl. No.: 09/365,271

(22) Filed: Jul. 30, 1999

(51) Int. Cl.$^{7}$ .................................................. B23B 49/00
(52) U.S. Cl. ............................................ 408/16; 408/13
(58) Field of Search ...................................... 408/13, 16

(56) References Cited

U.S. PATENT DOCUMENTS

| | | | | |
|---|---|---|---|---|
| 3,635,108 A | * | 1/1972 | Prince | 82/1 |
| 3,773,404 A | * | 11/1973 | Moore | 219/121 |
| 4,079,534 A | * | 3/1978 | Sayder | 42/1 A |
| 4,506,745 A | * | 3/1985 | Bjor | 175/45 |
| 4,712,953 A | * | 12/1987 | Witzel et al. | 409/131 |
| 5,148,232 A | * | 9/1992 | Duey et al. | 356/152 |
| 5,361,854 A | * | 11/1994 | Tull et al. | 175/45 |
| 5,675,899 A | * | 10/1997 | Webb | 30/390 |
| 5,741,096 A | * | 4/1998 | Olds | 408/1 R |
| 6,062,778 A | * | 5/2000 | Szuba et al. | 408/156 |

FOREIGN PATENT DOCUMENTS

| | | | | |
|---|---|---|---|---|
| DE | 2838968 | * | 3/1980 | 408/16 |
| DE | 3308290 | * | 9/1984 | 408/16 |
| FR | 2653046 | * | 4/1991 | 408/16 |

* cited by examiner

*Primary Examiner*—A. L. Wellington
*Assistant Examiner*—Monica S. Carter
(74) *Attorney, Agent, or Firm*—Rick Martin; Patent Law Offices of Rick Martin, P.C.

(57) ABSTRACT

The present invention has a laser mounted on the casing of the drill such that the laser is in line with the bit and pointing in the reverse direction. This allows the laser to be used to align the drill bit with a mark or hole such that the drill bit is directly in line with the preexisting mark. A bubble level is included to ensure that the drill is held level or plumb when it needs to be level or plumb. A retrofit mount allows the present invention to be used with pre-existing hand held power drills. The mount can be designed to allow the laser to point backward or forward. The retrofit mount locks on to the machined race of a hand held power drill using a metal collar and bolts. An arm extends either back over the body of the drill in the reverse pointing application or up from the collar in the forward pointing application. A small laser is mounted to the arm such that the laser is aligned with the drill bit. A bubble level is included to ensure the drill is held level or plumb when it needs to be held level or plumb.

20 Claims, 3 Drawing Sheets

LASER GUIDE FOR HAND HELD POWER DRILL

FIELD OF INVENTION

The present invention relates to a laser guide for a hand held power drill. More particularly, this invention relates to a means to mount a small laser on a hand held power drill such that the laser can be used to align the bit of the power drill with a desired object.

BACKGROUND OF THE INVENTION

It is well known to use a laser as a pointer to guide the targeting of various devices, including guns and missiles. In most of these applications the laser aligns with the target point of the device. But in these devises the objective is completed as soon as the device or laser reaches its target. Not so in boring a hole. The objective is only started when the point of a drill bit begins to penetrate the surface of a material. It is generally easy to bore a hole through ¼" of material. However, the difficulty is increased as the material gets thicker. Additionally, the difficulty is compounded many times over if that hole must be directly in line with another hole or object. Example: you must bore a hole through a 12 inch thick wall to install a steel pipe for a gas line, and that steel pipe must line up with a fitting ten feet away. It is easy to start the hole but it is almost impossible to bore that hole through 12 inches of material and get that steel pipe to line up with the fitting, unless you use the fitting as a target. By fastening a laser to the back of the drill and shining that laser directly in line with the drill bit (but in the opposite direction) and shining that laser beam at the target (in this case the fitting) you can bore a hole through 12 inches of material or 12 feet of material and still be directly in line with that target or fitting.

Another application is the installation of hand railings or stairway hand railings. The holes bored in a hand rail post must be directly in line with the holes drilled in the next post in order to receive the rails that would go in between the two hand rail posts. And the holes bored in the horizontal rails must be directly in line with each other in order to receive the balusters that go in between the top and bottom rails.

Another application is the manufacturing of circle stairways. The holes bored in the center column must be exactly in line with the stair tread in order to receive the stair tread.

Another application would be shining the laser forward by mounting the laser above and parallel to the drill bit, even 10 or 12 inches above the drill bit. This would allow in line boring of material with a forward mounted target. Example: boring a hole all the way through a post on a deck to run a wire through it in order to put a light on top of that post.

When mounting a laser on a hand held power drill another problem is encountered. The vibrations of the power drill require that the laser must be held very securely in place to be useful. The present invention solves all the known problems, thus providing a laser guided hand held power drill.

SUMMARY OF THE INVENTION

The main aspect of the present invention is to produce the effect of in line boring using a laser guided hand held drill without the use of additional mechanical alignment devices.

Another aspect of the present invention is to allow the user to drill a series of holes in a series of work pieces so that the holes are directly in line with each other.

Another aspect of the present invention is to allow the user to bore a perfectly in line hole that is small (about ½" in diameter) and than make it larger by boring out that hole with a pilot bit (about 1"–10"in diameter)

Another aspect of the invention is to allow the user to drill a series of holes in a work piece, wherein said holes are a given distance apart only having to measure the first hole.

Another aspect of the present invention is to provide a means to retrofit a laser guide on an existing hand held power drill.

Another aspect of the present invention are to provide bubble levels built into the laser and or hand held drill in the case that a hole would need to be bored either plumb or level without having a target for the laser to point at.

Other aspects of this invention will appear from the following description and appended claims, reference being made to the accompanying drawings forming a part of this specification wherein like reference characters designate corresponding parts in the several views.

The present invention solves the above problems by mounting the laser in the casing of the drill such that the laser is in line with the bit and pointing in the reverse direction. This allows the laser to be used to align the drill bit with a mark or hole such that the drill bit is directly in line with the preexisting mark. A retrofit mount allows the present invention to be used with pre-existing hand held power drills. The mount can be designed to allow the laser to point backward or forward.

The present invention's retrofit mount locks on to the machined race of a hand held power drill using a metal collar and bolts. An arm extends either back over the body of the drill in the reverse pointing application or up from the collar in the forward pointing application. A small laser is mounted to the arm such that the laser is aligned with the drill bit.

Figure 2:
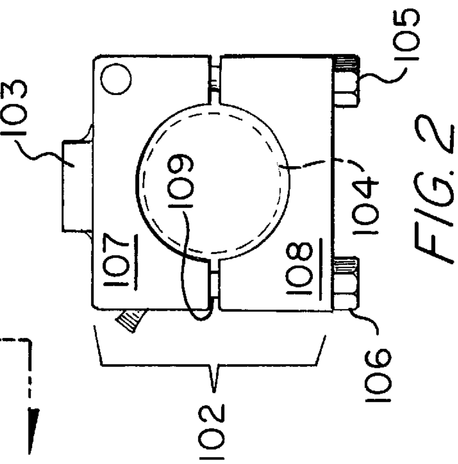
FIG. 2. is a cross section of the back pointing retrofit mount taken along line 2—2 of FIG. 1.
Figure 1:
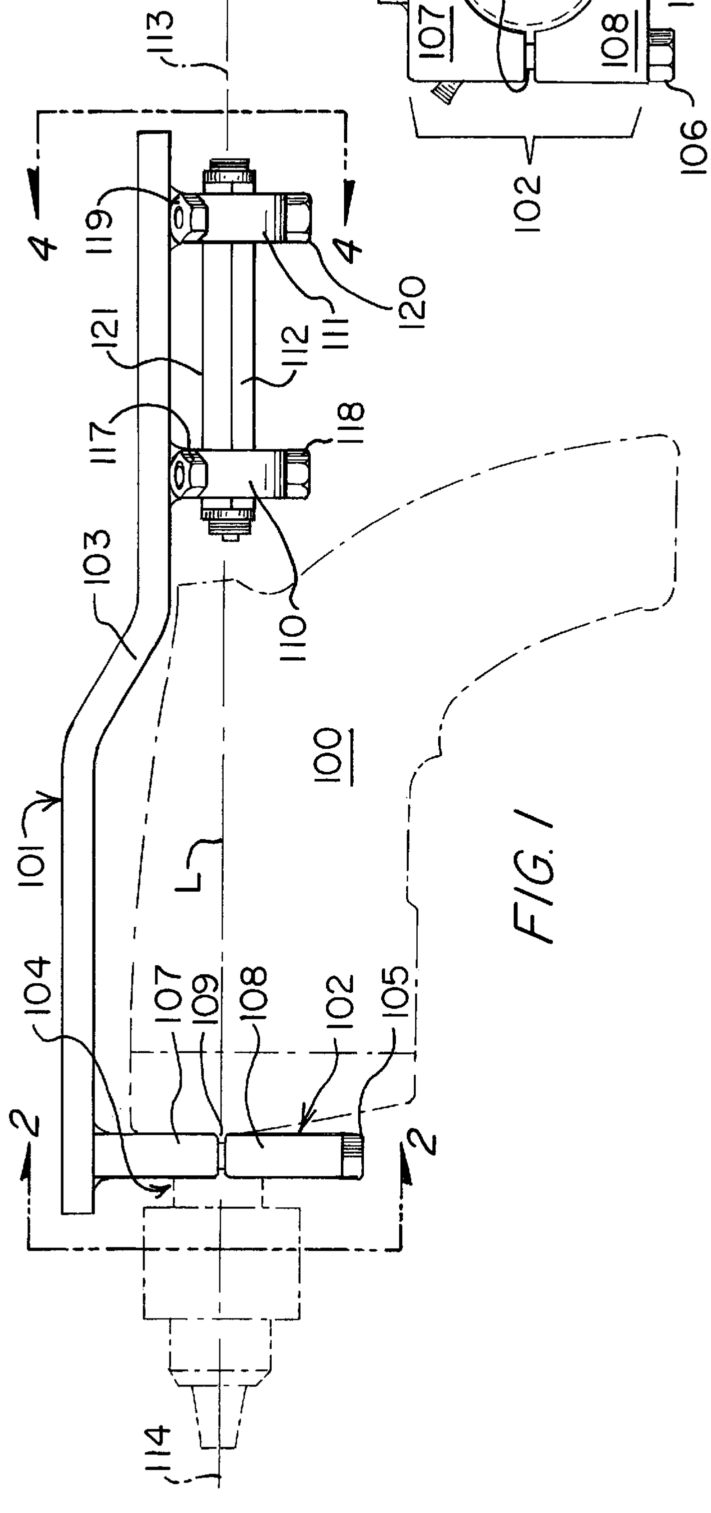
FIG. 1 is a side plan view of a back pointing retrofit mount on a hand held power drill.
Figure 3:
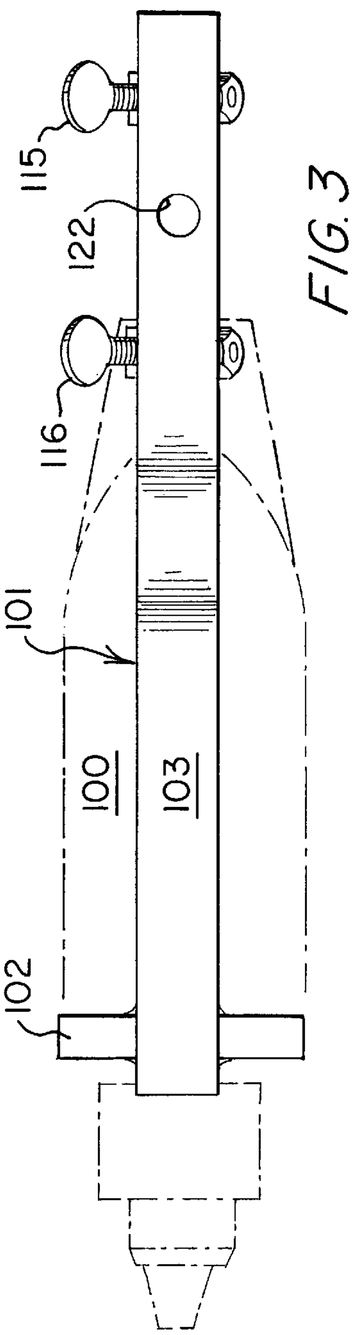
FIG. 3 is a top plan view of a back pointing retrofit mount on a hand held power drill.
Figure 4:
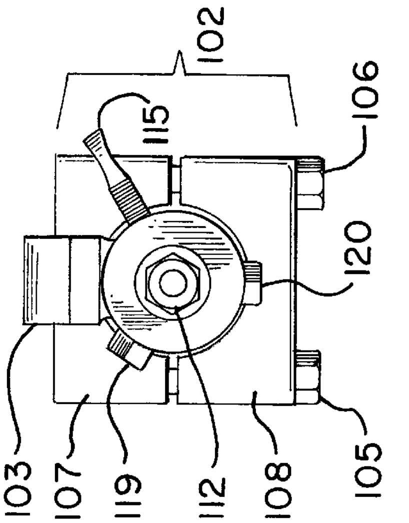
FIG. 4 is a back plan view of the back pointing retrofit mount on a hand held power drill along line 4—4 of FIG. 1.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PRESENT INVENTION

Referring first to FIGS. 1, 2,3 and 4, a hand held power drill 100 has a back pointing laser mount 101. The back pointing laser mount 101 has a collar 102 and an arm 103. The collar 102 has a top 107 and a bottom 108, which are placed around the machined race 104 of the drill 100. The collar 102 is locked in place by bolts 105, 106. The machined race 104 must be stable enough and sturdy enough to allow the collar 102 to securely lock in place.

At present the only hand held power drill which is known to have a stable enough machined race to allow the retrofit mount to be used is the Milwaukee Electric Tool Corporation's Magnum Drill. However, a collar 102 could be shaped to fit any machined race 104. Care must be taken when tightening the bolts 105, 106 so that they are evenly tightened. The space 109 between the top 107 and bottom 108 of the collar 102 must be even on both sides as shown in FIG. 2.

The arm 103 is attached to the top 107 of collar 102. The arm 103 extends back over the drill 100 and beyond the tail end of the drill. Laser mounts 110, 111 are attached to the underside of the arm 103. The laser casing 112 is placed inside the laser mounts 110, 111 and held in place with thumbscrews 115, 116. The laser casing 112 must be mounted so that the laser beam 113 is aligned with the drill bit 114 as shown by line L. The laser beam 113 can point the same direction as the drill bit 114, or in the opposite direction along line L. In the preferred embodiment the laser beam 113 is aligned along line L such that it is co-axial with the drill bit and points 180° from the working end of drill bit 114. Screws 117, 118, 119, and 120 are provided to allow the alignment of the laser casing 112 to be adjusted in the laser mounts 110, 111.

A bubble level 121 is included in the laser casing 112 to allow the user to check that the drill 100 is held level if necessary. Hole 122 in the arm 103 allows the user to see the bubble level 121. Alternatively the bubble level 121 could be mounted on the top surface of the arm 103 (Not shown).

Figure 5:
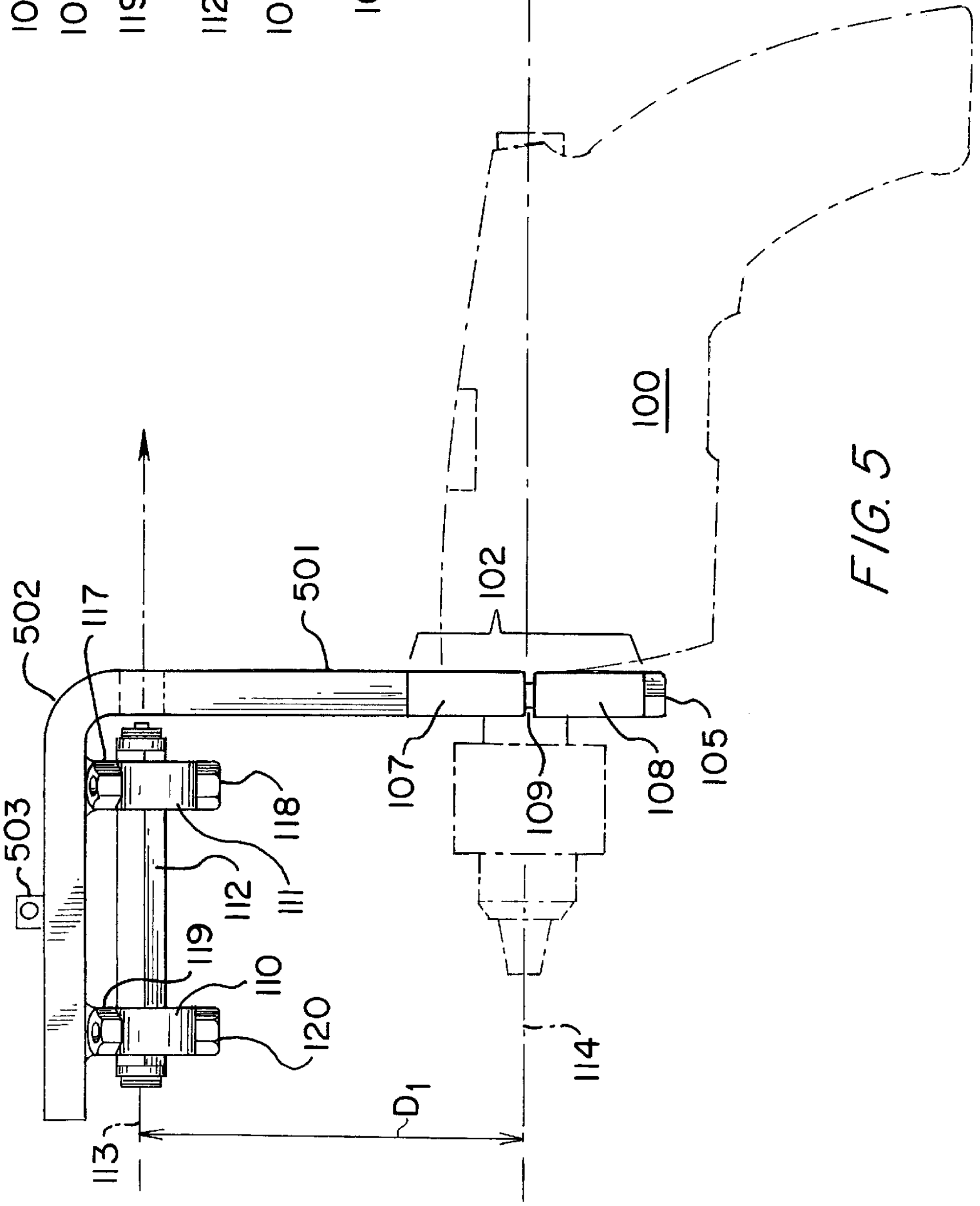
FIG. 5 is a side plan view of an alternate embodiment forward pointing retrofit mount on a hand held power drill.

Referring next to FIG. 5., an arm 501 extends up from collar 102 to allow the laser beam 113 to be mounted pointing forward. The arm 502 extends forward from arm 501 and is parallel to the drill bit 114. The laser casing 112 is mounted to arm 502 exactly as described above. The laser beam 113 is set to be a given distance D1 above the drill bit 114 and exactly parallel to it. This embodiment allows the user to align the laser with a given spot and drill exactly D1 below that spot. Bubble level 503 is provided to prevent side-to-side misalignment of the drill bit 114 and the laser beam 113. This ensures that the drilled holes are directly beneath the mark.

An alternate embodiment (not shown) is to have arm 503 be slideably adjustable so that $D_1$ is a variable distance. It is known in the art that a fitting (not shown) could be attached to collar 102 to allow either the backward extending arm 103 or the upward extending arm 502 to be attached to the collar 102. Said fitting would have to be stable enough that the arms 102, 502 would not vibrate more than the collar 102.

Figure 6:
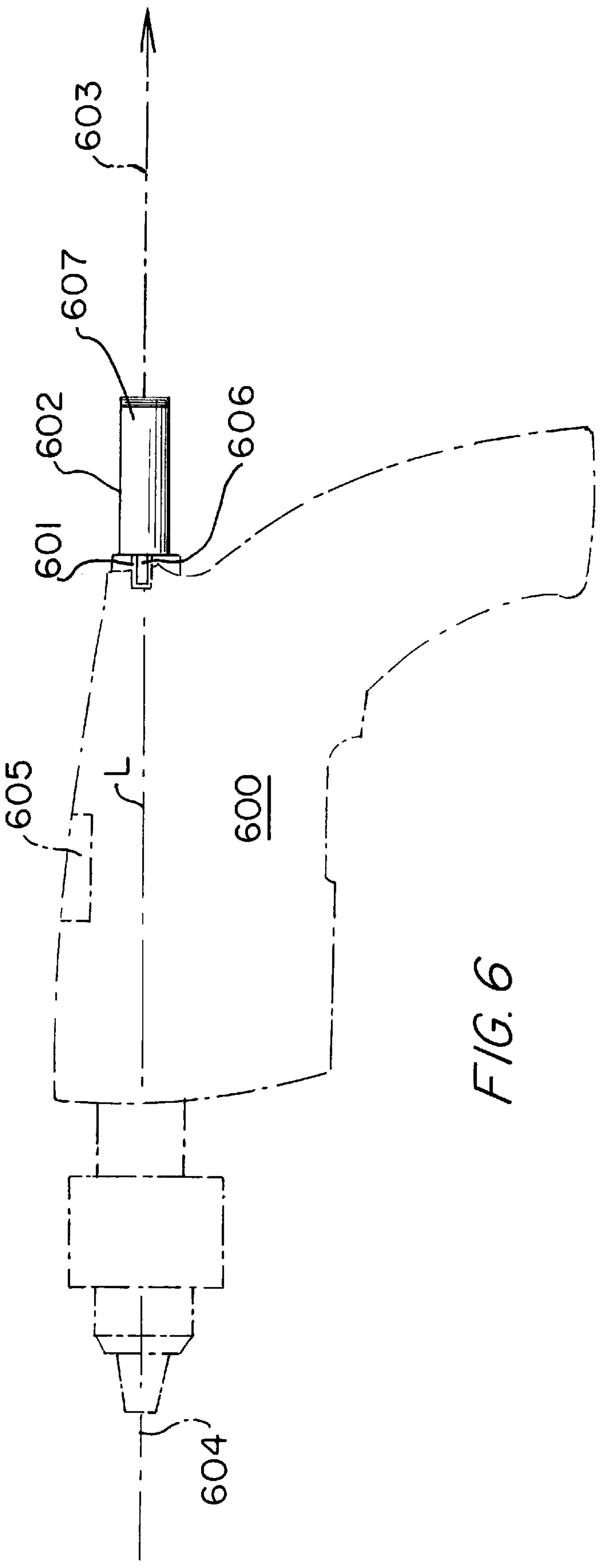
FIG. 6 is the preferred embodiment of the present invention with the laser mounted on the casing of the hand held power drill.

Referring next to FIG. 6 the preferred embodiment is shown. In the preferred embodiment the case 600 of the hand held power drill has a threaded hole 601. The laser casing 602 has a threaded end 606 adapted to screw into hole 601. It is essential that the laser casing 602 be held securely in place and that threaded hole have a positive stop so that the laser always is in the same position. The laser casing 602 is set such that the laser beam 603 aligns along line L with the drill bit 604. The casing of the laser has three adjustment screws 607 evenly spaced around the laser. The adjustment screws 607 allow the laser beam 603 to be precisely aligned with the drill bit 604. A bulls eye bubble level (not shown) is also provided which can be threaded into hole 601 when the laser is not in use. This allows the user to drill a hole plumb.

An alternate embodiment would be to have the laser casing 602 formed as an integral part of the drill case 600 (not shown). This would not allow for easy replacement of the laser and so is presently considered less desirable. Bubble level 605 is provided to allow the user to ensure that the drill is held level when needed.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A laser and hand held power drill case with a drill bit combination comprising:

said laser having a laser beam, said laser having a mount for the hand held power drill case, and wherein the laser beam is aligned co-axially with the drill bit and pointing in a direction 180° to a working end of said drill bit.

2. The hand held power drill of claim 1 further comprising a bubble level mounted in the case.

3. A laser and hand held power drill case combination, said laser having a laser beam, said laser having a mount for a hand held power drill case, wherein said mount further comprises:

a threaded hole in the hand held power drill case;

a threaded end of the laser, opposite the laser beam; and said threaded end threaded into said threaded hole.

4. A mount comprising:

a collar having an interior surface shaped to fit around a machined race of a hand held power drill;

an arm attached to said collar and extending backward over said hand held power drill when the mount is placed on said hand held power drill; and at least one laser mount attached to said arm, said laser mount holding a laser such that a laser beam from said laser is aligned co-axially with a drill bit of the hand held power drill when the mount is placed on said hand held power drill.

5. The mount of claim 4, wherein the collar further comprises:

a top member, a bottom member, said members having an attachment together around the machined race.

6. The mount of claim 4, wherein the laser mount further comprises:

screws through said laser mount adapted to hold the laser in place and allow a direction of the laser beam to be adjusted.

7. The mount of claim 4, wherein the laser further comprises a bubble level.

8. A mount comprising:

a collar having an interior surface shaped to fit around a machined race of a hand held power drill;

an arm attached to said collar and extending upward from said hand held power drill when the mount is attached to said hand held power drill; and a laser attached to said arm such that a laser beam from said laser has an alignment with a drill bit of the hand held power drill when the mount is attached to said hand held power drill.

9. The mount of claim 8, wherein the laser beam is parallel with the drill bit.

10. The mount of claim 8, wherein the collar further comprises:

a top piece, a bottom piece, said pieces having an attachment together around the machined race.

11. The mount of claim 8, wherein the laser mount further comprises:

screws through said laser mount adapted to hold the laser in place and allow a direction of the laser beam to be adjusted.

12. The mount of claim 8 further comprising a bubble level attached to the arm.

13. In a hand held power tool having a working end holding a working tool having an axis which extend along the working tool, said working tool having a preferred alignment with a workpiece, an improvement comprising:

a sighting laser mounted to said hand held power tool, wherein said sighting laser has a laser beam with an alignment co-axial with said working tool.

14. The improvement of claim 13, wherein said laser has a mounting brace attached to said hand held power tool.

15. The improvement of claim 13, wherein the laser is mounted directly to the power tool.

16. The improvement of claim 13, wherein said laser has a beam pointing in a common direction as the working tool.

17. The improvement of claim 13, wherein said power tool is a hand held power drill.

18. A laser and hand held power drill with a drill bit combination comprising:

said laser having a laser beam, said laser having a mount integral in a case of the hand held power drill, such that the laser beam is aligned co-axially with a bit of the hand held power drill.

19. A laser having a laser beam in combination with a hand held power drill having a case, said laser having a mount for the hand held power drill case wherein said mount further comprises:

a receiving connector in the hand held power drill case;

an attachment connector on the mount, opposite the laser beam; and said attachment connector removably attached to said receiving connector.

20. A laser and hand held power drill with a drill bit combination comprising:

said laser having a laser beam, said drill bit having a working end, and said laser having a mount integral in a case of the hand held power drill, such that the laser beam is aligned co-axially with a bit of the hand held power drill and pointing in a direction opposite to the working end of said drill bit.

* * * * *